United States Patent [19]
Glemser et al.

[11] Patent Number: 5,569,562
[45] Date of Patent: Oct. 29, 1996

[54] MANGANESE (III)-CONTAINING NICKEL (II) HYDROXIDE FOR THE PRODUCTION OF SECONDARY BATTERIES

[75] Inventors: Oskar Glemser; Peter Axmann, both of Göttingen, Germany

[73] Assignee: H.C. Starck, GmbH & Co. KG, Goslar, Germany

[21] Appl. No.: 260,878

[22] Filed: Jun. 16, 1994

[30] Foreign Application Priority Data

Jul. 9, 1993 [DE] Germany .................. 43 23 007.5

[51] Int. Cl.⁶ .................................................. H01M 4/52
[52] U.S. Cl. .................... 429/223; 252/519; 501/126
[58] Field of Search ...................... 252/519; 501/126; 429/223

[56] References Cited

U.S. PATENT DOCUMENTS

| | | | |
|---|---|---|---|
| 3,911,094 | 10/1975 | Megahed et al. | 429/223 X |
| 4,481,128 | 11/1984 | Jackovitz et al. | 252/519 X |
| 4,985,318 | 1/1991 | Oshitani et al. | 429/223 |

FOREIGN PATENT DOCUMENTS

| | | | |
|---|---|---|---|
| 2356286 | 1/1978 | France | H01M 4/04 |
| 52-028628 | 3/1977 | Japan | H01M 4/62 |
| 5-047380 | 2/1993 | Japan | H01M 4/32 |

OTHER PUBLICATIONS

J. P. Harivel, B. Morignat, J. Labat, J. F. Laurent "Structure and Electrochemical Properties of Nickel Hydroxides", pp. 239–255 (month N/A).

Electrochimica Acta, vol. 32, pp. 1783–1786, 1987 (Month N/A).

Electrochimica Acta, vol. 31, pp. 1321–1332, 1986 (Month N/A).

J. Electrochem. Soc., vol. 136, No. 3, Mar. 1989, pp. 723–728.

J. Electrochem. Soc. vol. 137, No. 8, Aug. 1990, pp. 2355–2361.

Chemical Abstracts, vol. 101, No. 8, 20 Aug. 1984, Columbus, Ohio, U.S., Abstract No. 6520G.

Chemical Abstracts, vol. 90, No. 18, Apr. 30, 1979, No. 143554C.

Primary Examiner—Stepehn Kalafut
Attorney, Agent, or Firm—Jerry Cohen

[57] ABSTRACT

Manganese(III)-containing nickel(II) hydroxide powders produced by coprecipitation carried out by dropping an acidified metal salt solution containing $Ni^{+2}$ and $Mn^{+3}$ ions into a feed of constant pH value, such that manganese(III) is incorporated into the nickel(II) hydroxide lattice, thereby preventing disproportionation into separate phases and improving performance characteristics of secondary battery electrodes manufactured therefrom.

16 Claims, No Drawings

MANGANESE (III)-CONTAINING NICKEL (II) HYDROXIDE FOR THE PRODUCTION OF SECONDARY BATTERIES

BACKGROUND OF THE INVENTION

The present invention relates to manganese (III)-containing nickel(II) hydroxide, a process for its production and its use as electrode material for secondary batteries.

Nickel(II) hydroxide is used in the alkaline accumulator as positive electrode mass. Changes in certain electrochemical properties are produced by incorporating various extraneous ions.

The incorporation of manganese ions in nickel(II) hydroxide is described in only a few publications. A reason for this is that the bivalent manganese in $\beta$-Mn(OH)$_2$ or in the mixed oxide with nickel is already very easily oxidized by atmospheric oxygen and the manganese in the end product does not exist in a defined oxidation state. The preparation of uniform products is thereby complicated.

Some references on the properties of manganese-doped nickel hydroxide electrodes are known from the literature:

J. P. Harivel, B. Morignat, J. Labat, J. F. Laurent, Power Sources 1966, Pergamon Press, ed. by D. H. Collins, p. 239, doped nickel(II) hydroxide with $Mn^{2+}$ or $Mn^{4+}$ by coprecipitation from aqueous sodium hydroxide solution. The doped hydroxides showed no improvements in the electrochemical properties by comparison with pure nickel hydroxide.

Cordoba et al. investigated the effect of nickel hydroxides doped with manganese and/or iron on the application as oxygen electrodes (S.I. Cordoba, M. Lopez Teijelo, V. A. Macagno, Electrochimica Acta 32 (1987), 1783, S. I. Cordoba, R. E. Carbonio, M. Lopez Teijelo, V. A. Macagno, Electrochimica Acta 31 (1986), 1321). The materials were here produced likewise by coprecipitation or else by deposition of the pure hydroxides above each other in layers.

D. A. Corrigan, R. M. Bendert, J. Electrochem. Soc. 136 (1989), 723 and D. Bélanger, G. Laperrière, J. Electrochem. Soc. 137 (1990), 2355 carried out cyclovoltammetric studies on cathodically deposited thin layers of $Mn^{2+}$-doped nickel hydroxide among other systems.

Practical conclusions with regard to the improvement of the properties and/or application of these materials in secondary batteries cannot, however, be derived from the literature mentioned.

The manganese-doped nickel hydroxide materials known from the prior art, as have been used up to now for the production of electrodes for secondary batteries, therefore have no important advantage over undoped material.

It was now the object of the invention so to improve the properties of manganese-doped nickel hydroxide powder for the production of battery electrodes that the capacity of the nickel hydroxide electrodes would be raised and the cyclic stability simultaneously improved.

SUMMARY OF THE INVENTION

It has now surprisingly been found that manganese as an additive to nickel hydroxide causes a particularly positive effect in the nickel hydroxide electrode when it exists in the nickel hydroxide electrode predominantly in the trivalent oxidation state.

This invention consequently provides manganese-containing nickel(II) hydroxide powders in which more than 50 mole % of the manganese exists in the trivalent oxidation state. Preferred embodiments of the invention follow from the sub-claims. An important economic side-effect of the invention is to make possible the replacement of the relatively expensive nickel by an appropriate, less expensive, proportion of manganese and thereby the achievement of an increased mass efficiency of the nickel hydroxide.

Nickel-manganese electrodes according to the invention, by comparison with undoped reference products, show a much increased efficiency of the one-electron step $Ni^{2+} \rightarrow Ni^{3+}$ and in addition an improved cycle stability.

The doping occurs by the replacement of $Ni^{2+}$ ions in the crystal lattice of the nickel hydroxide by $Mn^{3+}$ ions. The $Mn^{3+}$ ion proves to be very suitable for this by reason of the radius ratio $Ni^{2+}/Mn^{3+}=1.05$.

The coprecipitation of the manganese(III) compound with the nickel hydroxide is carried out by dropping an acidified metal salt solution containing $Ni^{2+}$ and $Mn^{3+}$ ions into a feed of constant pH value. While the $Ni^{2+}$ ion can be used in the form of its salts, the $Mn^{2+}$ ion is prepared in the salt solution by reaction of $Mn^{2+}$ ions with corresponding amounts of $MnO_4$ $MnO_4^-$ ions. This is achieved by continuous combination of the corresponding solutions in a mixing chamber. Both solutions can at this time already contain nickel(II) salts. An $Mn^{3+}$ solution can also be mixed with an $Ni^{2+}$ solution later.

The $Mn^{3+}$ ion is formed according to the equation:

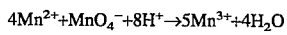

$$4Mn^{2+}+MnO_4^-+8H^+\rightarrow 5Mn^{3+}+4H_2O$$

The average degree of oxidation of the manganese ion in the nickel hydroxide matrix can be deliberately varied by an appropriate excess of $Mn^{2+}$ or $MNO_4^-$ ions.

Trivalent manganese is very unstable in solution. It disproportionates rapidly in aqueous solution with formation of hydrated oxides of manganese(II) and of manganese(IV). If this process goes to completion in its salt solution, the manganese can no longer be incorporated into the nickel hydroxide lattice and separate phases of hydrated manganese oxides in addition to nickel hydroxide precipitate in the precipitation step.

This disproportionation must be eliminated in order to bring about the incorporation of the manganese in the host matrix. It is sufficiently well known from the literature that the $Mn^{3+}$ ion can be stabilized briefly in the presence of suitable anions (e.g. sulphate, phosphate, acetate etc.). It is therefore important for the production of the precipitation product that sufficient amounts of stabilizing anions or their mixtures are present in the combined salt solution to eliminate a premature decay reaction of the $Mn^{3+}$ ions. In this process, the lifetime of the $Mn^{3+}$ depends on the nature of the anions, their concentration in the solution and the solution's pH value. The length of the reaction zone must also be calculated according to this lifetime:

Too short a reaction zone can lead to an inadequate intermixing of the reacting solution or an incomplete reaction, and the products become non-uniform.

If the reaction zone is too long, the $Mn^{3+}$ ions decompose too early, which prevents their incorporation in the $Ni(OH)_2$.

In conclusion, the $Ni^{2+}/Mn^{3+}$ mixed hydroxide is precipitated by dropwise addition of the acidic salt solution containing $Ni^{2+}$ and stabilized $Mn^{3+}$ to an alkaline feed of constant pH value. After the precipitation, the $Mn^{3+}$ is fixed as such in the $Ni(OH)_2$ lattice, and disproportionation can no longer occur.

DETAILED DESCRIPTION OF PREFERRED EMBODIMENTS

In the following, the invention is illustrated by the following non-limiting examples.

EXAMPLE 1

Solution A: 10.04 g (0.04 moles) Mn (NO$_3$)$_2$.4H$_2$O 58.16 g (0.20 moles) Ni(NO$_3$)$_2$.6H$_2$O 12.50 g H$_2$SO$_4$ 97% 10.00 g HAc 99% 10.00 g H$_3$PO$_4$ 85% H$_2$O to 250 ml Solution B: 1.58 g (0.01 moles) KMnO$_4$ 12.50 g H$_2$SO$_4$ 97% 10.00 g HAc 99% 10.00 g H$_3$PO$_4$ 85% H$_2$O to 250 ml Correction alkali: 250 ml KOH, c=3,526 mole/l Feed: 1000 ml KOH with pH 12.50±0.02 T=33±2° C.

EXAMPLE 2

Solution A: 12.55 g (0,050 moles) Mn(NO$_3$)$_2$.4H$_2$O 54.53 g (0.188 moles) Ni(NO$_3$)$_2$.6H$_2$O 12.50 g H$_2$SO$_4$ 97% 10.00 g HAc 99% 10.00 g H$_3$PO$_4$ 85% H$_2$O to 250 ml Solution B: 1.98 g (0.0125 moles) KMnO$_4$ 12.50 g H$_2$SO$_4$ 97% 10.00 g HAc 99% 10.00 g H$_3$PO$_4$ 85% H$_2$O to 250 ml Correction alkali: 500 ml 3.5 m KOH Feed: 1000 ml KOH with pH 12.50±0.02

Implementation of the process

The solutions A and B were brought together continuously with the aid of separate pumps at the same volumetric flow rate (100 ml/h) via a Y-shaped mixing chamber. During this, the spatially separated formation of Mn$^{3+}$ could be followed in the subsequent reaction zone (glass tube). The colour change was from violet (MnO$_4$) to red (Mn$^{3+}$ in presence of Ni$^{2+}$).

After a constant total reaction time of ca. 20 sec., the solution dropped into a feed of KOH, in which the pH value was checked with the aid of a glass electrode and held constant (pH 12.50±0.02) by addition of correction alkali. In this way both the reacting state of the Mn$^{3+}$ to the precipitation point and the precipitation process itself were always standardized and controllable.

The brown-red product was centrifuged off after 15 hours ageing and washed 5 times, with 650 ml alkali of pH 12.50 on each occasion, and then dried in vacuum at 51° C. for three days.

The product gave a characteristic X-ray spectrum. For more precise characterisation, the accurate analytical data were determined for Example 1:

Chemical Analysis

| (Example 1) | Element/ anion | Mean value [%] | Molar proportion N |
|---|---|---|---|
| | Ni | 46.67 | 4.00 |
| | Mn | 10.87 | 1.00 |
| | H | 2.55 | 12.83 |
| | MnO$_2$ | 9.27 | 0.54 |
| | SO$_4^{2-}$ | <1 | < |
| | PO$_4^{3-}$ | 1.54 | 0.08 |
| C & N | outside the calibration range | | |

1. Degree of oxidation of the manganese:

$$x \text{ in MnO}_x \quad x = \left[ 1 + \left( \frac{^N\text{MnO}_2}{^N\text{Mn total}} \right) \right]$$

$$X = 1.54$$
Mn$^{3.08}$ is present

Proportion of the nickel substituted:

A) Based on the molar ratios Ni/Mn, the nickel saving is 20 mole%.

B) From the comparison of the analytical Ni content for pure nickel hydroxide (62%) and for the doped product (46%), a nickel saving of 26% per unit mass is found.

2. Investigation of the cycle behaviour

For the examination of the electrochemical properties of the active material, galvanostatic charges and discharges vs Cd/Cd(OH)$_2$ or Hg/HgO were carried out. The electrode was produced as a pellet from 1.00 g active mass, 0.25 g graphite and 0.03 g PTFE.

Electrolyte: 7 m KOH

Charge: 11 h at 50 mA

Discharge: 25 mA up to the cut-off voltage of V vs Hg/HgO or 1 V vs Cd/Cd (OH)$_2$ By comparison with a sample of pure nickel hydroxide, with the same preparation technique and under the same cyclisation conditions, the product shows a distinct improvement of the cycle stability:

The pure nickel hydroxide already reaches its maximum capacity after 10 cycles, followed by a continuous decline. This effect cannot be observed with the manganese-doped sample until between 150 and 200 cycles. (It was demonstrated by replacement of the electrolyte that at these high cycle numbers the carbonation of the alkali makes a definite contribution to the loss of capacity). For the manganese-doped mass the measured capacities were 205 mAh/g in the range from Cycle 100 to 150, followed by an insignificant decline of the capacity (198 mAh/g in Cycle 200).

In addition, the mass efficiency of the nickel is definitely raised in the manganese-doped product. More than 90% of the theoretical one-electron step from Ni$^{2+}$ to Ni$^{3+}$ can be utilised over a wide cycle range. The undoped nickel hydroxide, on the other hand, More than 90% of the theoretical one-electron step from Ni$^{2+}$ to Ni$^{3+}$ can be utilised over a wide cycle range. The undoped nickel hydroxide, on the other hand, with only 60% utilisation of the discharge capacity at the maximum, lies definitely lower under the same experimental conditions.

After an over-discharging (cycle 30), a manganese-doped sample lost ca. 10% of its capacity based on the one-electron step, but the cycle behaviour showed no setback. The value for the discharge capacity remained almost constant over more than 200 cycles, with 75% efficiency of the one-electron step.

I claim:

1. Manganese III-containing nickel (II) hydroxide powder, characterised in that the manganese ion is incorporated into the nickel hydroxide lattice and more than 50% of the manganese is present in the trivalent oxidation stage.

2. Nickel (II) hydroxide powder according to claim 1, characterized in that at least 80 mol % of the manganese is present in the trivalent oxidation stage.

3. Nickel (II) hydroxide powder according to either of claims 1 or 2, characterized in that at least 90 mol % of the manganese is present in the trivalent oxidation stage.

4. Nickel (II) hydroxide powder according to either of claims 1 or 2, characterized in that the molar ratio of Ni to Mn is in the range from 100 to 1 to 1 to 1.

5. Nickel (II) hydroxide according to claim 4, characterized in that the molar ratio of nickel to manganese is in the range from 5 to 1 to 3 to 1.

6. Nickel (II) hydroxide according to either of claims 1 or 2, characterized in that the molar ratio of nickel to manganese is in the range from 5 to 1 to 3 to 1.

7. Nickel (II) hydroxide powder according to claim 6, characterized in that it has one or more elements of the group Cd, Co, Zn, Ca and Mg in a total amount of no more than 8 mol %, based on the total amount of nickel and manganese.

8. Nickel (II) hydroxide powder according to either of claims 1 or 2, characterized in that it has one or more elements of the group Cd, Co, Zn, Ca and Mg in a total amount of no more than 8 mol %, based on the total amount of nickel and manganese.

9. Nickel (II) hydroxide powder according to claim 8, characterized in that it has a particle size of 1 to 100 μm.

10. Nickel (II) hydroxide powder according to either of claims 1 or 2, characterized in that it has a particle size of 1 to 100 μm.

11. Process for the production of manganese (III) containing nickel (II) hydroxide powders, characterised by coprecipitating nickel (II) and manganese (III) salt solutions with alkali solutions, such that manganese(III) is incorporated into the nickel(II) hydroxide lattice.

12. Process according to claim 11, characterised by the production of peracetic acid due to combining manganese (II) salt solutions with corresponding amounts of permanganate solution or other oxidising agents such as peroxodisulphate or $H_2O_2$.

13. Process according to either of claims 11 or 12, characterized in that the manganese (III) salt solutions contain stabilizing anions.

14. Process according to either of claims 11 or 12 characterized in that the coprecipitation is carried out in the presence of soluble salts of an element selected from the group consisting of Co, Zn, Cd, Ca and Mg.

15. Method of making a secondary battery alkaline accumulator positive electrode comprising the step of combining nickel (II) hydroxide powder according to either of claims 1 or 2 with other constituent elements.

16. A secondary battery comprising an alkaline accumulator positive electrode made, at least in part, of nickel (II) hydroxide powder as recited in either of claims 1 or 2.

* * * * *